US010736199B2

(12) United States Patent
Yotsumoto et al.

(10) Patent No.: US 10,736,199 B2
(45) Date of Patent: Aug. 4, 2020

(54) INFORMATION PROCESSING METHOD, INFORMATION PROCESSING SYSTEM, AND ELECTRIC LIGHT BULB LIGHT SOURCE APPARATUS

(71) Applicant: SONY CORPORATION, Tokyo (JP)

(72) Inventors: Naoki Yotsumoto, Tokyo (JP); Takashi Sato, Tokyo (JP); Kiyoshi Yoneda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 232 days.

(21) Appl. No.: 15/779,302

(22) PCT Filed: Nov. 15, 2016

(86) PCT No.: PCT/JP2016/004876
§ 371 (c)(1),
(2) Date: May 25, 2018

(87) PCT Pub. No.: WO2017/104104
PCT Pub. Date: Jun. 22, 2017

(65) Prior Publication Data
US 2018/0324932 A1 Nov. 8, 2018

(30) Foreign Application Priority Data
Dec. 17, 2015 (JP) .................................. 2015-245817

(51) Int. Cl.
H05B 47/19 (2020.01)
G06F 13/00 (2006.01)
(Continued)

(52) U.S. Cl.
CPC ............ H05B 47/19 (2020.01); G06F 13/00 (2013.01); H04L 12/282 (2013.01); H04Q 9/00 (2013.01);
(Continued)

(58) Field of Classification Search
None
See application file for complete search history.

(56) References Cited

U.S. PATENT DOCUMENTS

2010/0084996 A1* 4/2010 Van De Sluis ........ H05B 45/20
315/312
2014/0035964 A1 2/2014 Hirofumi Kasuga

FOREIGN PATENT DOCUMENTS

JP 2002-299072 A 10/2002
JP 2009-259657 A 11/2009
(Continued)

OTHER PUBLICATIONS

International Search Report and Written Opinion of PCT Application No. PCT/JP2016/004876, dated Feb. 21, 2017, 07 pages of ISRWO.

Primary Examiner — Carlos Garcia
(74) Attorney, Agent, or Firm — Chip Law Group

(57) ABSTRACT

This information processing method is executed by an electric light bulb light source apparatus, which includes a lighting unit, and a functional unit, the information processing method including: selecting, from any of a parent mode and a child mode, an operation mode for cooperative control with a different electric light bulb light source apparatus with respect to the functional unit, and setting the selected operation mode. In a case where the parent mode is set, the lighting unit is caused to execute a first lighting operation for the parent mode in response to a predetermined lighting control signal relating to an operation of the lighting unit, and a cooperative control signal for causing a second lighting operation for the child mode to be executed is transmitted to the different electric light bulb light source apparatus set to the child mode, the second lighting operation for the child mode being different from the first lighting operation. In a case where the child mode is set, the lighting
(Continued)

unit is caused to execute the second lighting operation on the basis of the cooperative control signal transmitted from the different electric light bulb light source apparatus set to the parent mode.

13 Claims, 7 Drawing Sheets

(51) Int. Cl.
*H04Q 9/00* (2006.01)
*H04L 12/28* (2006.01)
*H05B 45/00* (2020.01)
*H05B 47/16* (2020.01)
*H05B 41/392* (2006.01)
*H05B 41/44* (2006.01)
*H05B 47/10* (2020.01)

(52) U.S. Cl.
CPC ......... *H05B 41/3921* (2013.01); *H05B 41/44* (2013.01); *H05B 45/00* (2020.01); *H05B 47/16* (2020.01); *H04L 2012/2841* (2013.01); *H05B 47/10* (2020.01)

(56) References Cited

FOREIGN PATENT DOCUMENTS

| JP | 2010-146392 A | 7/2010 |
| JP | 2014-032750 A | 2/2014 |

\* cited by examiner

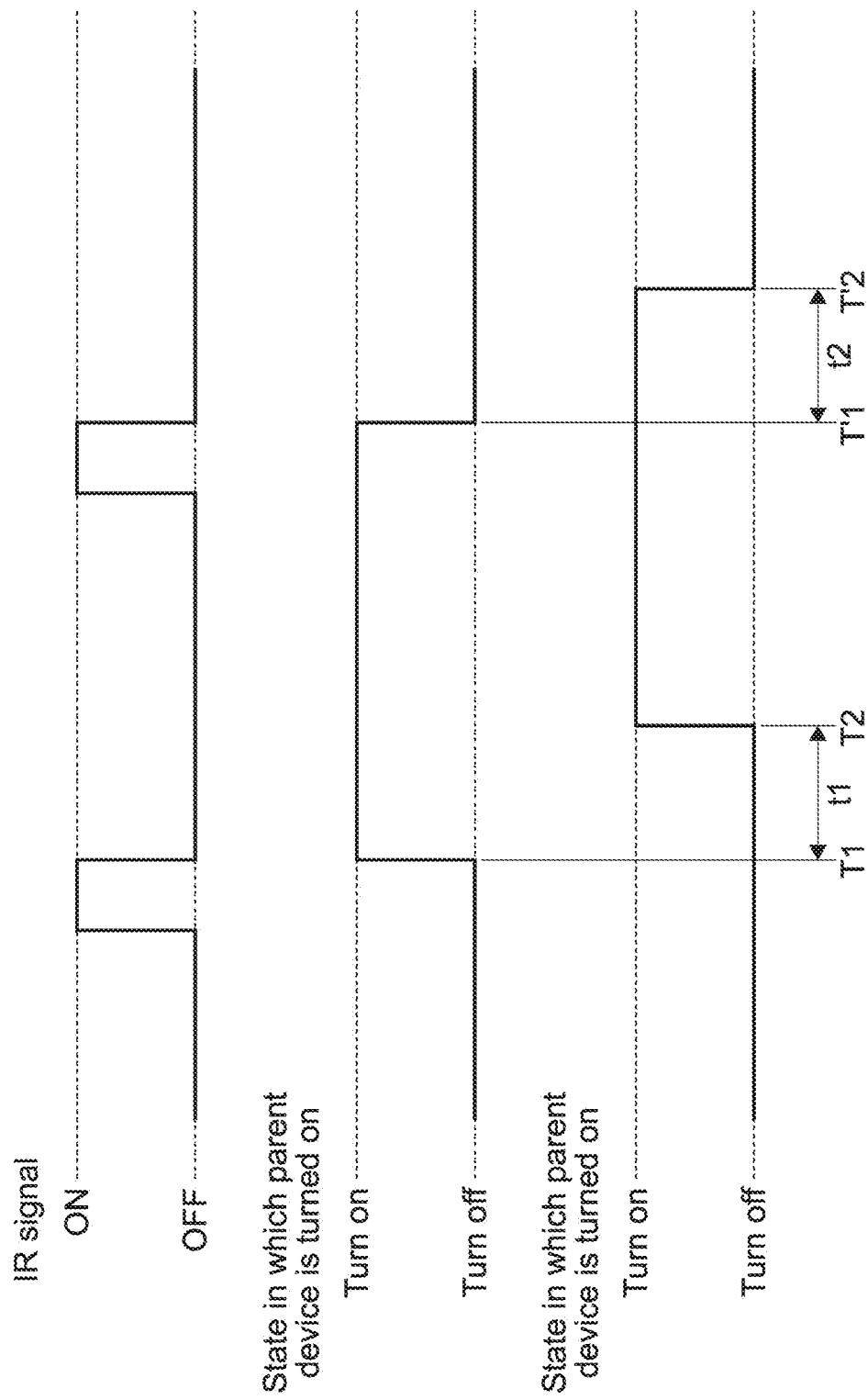

INFORMATION PROCESSING METHOD, INFORMATION PROCESSING SYSTEM, AND ELECTRIC LIGHT BULB LIGHT SOURCE APPARATUS

CROSS REFERENCE TO RELATED APPLICATIONS

This application is a U.S. National Phase of International Patent Application No. PCT/JP2016/004876 filed on Nov. 15, 2016, which claims priority benefit of Japanese Patent Application No. JP 2015-245817 filed in the Japan Patent Office on Dec. 17, 2015. Each of the above-referenced applications is hereby incorporated herein by reference in its entirety.

TECHNICAL FIELD

The present technology relates to an electric light bulb light source apparatus, an information processing method applicable thereto, and an information processing system.

BACKGROUND ART

In the past, a system in which a plurality of lighting devices are operated in cooperation with each other has been devised. For example, in a lighting control system disclosed in Patent Literature 1, wireless mutual communication is executed between the devices, and the signal level and the communication response time between them are measured. The measurement data measured by the devices is collected by a parent device, and the order of distance between the devices is set on the basis of the collected measurement data. Each of the devices executes turning on control on the basis of the order of distance set by the parent device. By such control, it is possible to automatically assign the turning on order reflecting the positional relationship between the devices. As a result, it is possible to maintain sequential turning on along a certain direction while changing the arrangement state of the lighting devices, and improve the stage effect by lighting (Paragraph [0026], [0031], [0041], and the like of the specification of Patent Literature 1).

CITATION LIST

Patent Literature

Patent Literature 1: Japanese Patent Application Laid-open No. 2009-259657

DISCLOSURE OF INVENTION

Technical Problem

There are various manners as a manner in which a plurality of lighting devices including a parent device and a child device as described in Patent Literature 1 are caused to operate in cooperation with each other. It is desirable for a user to be capable of easily grasping the operation state (operation mode) of the plurality of lighting devices that operate in cooperation with each other.

In view of the circumstances as described above, it is an object of the present technology to provide an information processing method capable of easily checking the operation modes of a plurality of electric light bulb light source apparatuses that operate in cooperation with each other, an information processing system, and an electric light bulb light source apparatus.

Solution to Problem

In order to achieve the above-mentioned object, an information processing method according to an embodiment of the present technology is an information processing method executed by an electric light bulb light source apparatus, which includes a lighting unit including a light source, and a functional unit having a predetermined function, the information processing method including: selecting, from any of a parent mode and a child mode, an operation mode for cooperative control with a different electric light bulb light source apparatus with respect to the predetermined function, and setting the selected operation mode.

In a case where the parent mode is set, the lighting unit is caused to execute a first lighting operation for the parent mode in response to a predetermined lighting control signal relating to an operation of the lighting unit, and a cooperative control signal for causing a second lighting operation for the child mode to be executed is transmitted to the different electric light bulb light source apparatus set to the child mode, the second lighting operation for the child mode being different from the first lighting operation.

In a case where the child mode is set, the lighting unit is caused to execute the second lighting operation on the basis of the cooperative control signal transmitted from the different electric light bulb light source apparatus set to the parent mode.

In this information processing method, any one of the parent mode and the child mode is set for the cooperative control relating to the predetermined function. Regarding the operation of the lighting unit, the first lighting operation for the parent mode is executed in the apparatus set to the parent mode. Further, the second lighting operation for the child mode is executed in the apparatus set to the child mode. Accordingly, a user is capable of easily checking the operation modes of the plurality of electric light bulb light source apparatuses that operate in cooperation with each other.

The predetermined lighting control signal may be a signal that controls at least one of turning on, turning off, dimming, and toning.

Since at least one of operations of turning on, turning off, dimming, and toning is executed in a different manner depending on the operation mode, the user is capable of easily checking the operation mode.

The first lighting operation may be a predetermined lighting operation at a first timing based on a timing at which the predetermined lighting control signal is received. In this case, the cooperative control signal may be a signal for causing the predetermined lighting operation at a second timing later than the first timing to be executed as the second lighting operation.

In this information processing method, the same lighting operation is executed at different timings according to the operation mode. That is, it is possible to achieve the time lag control of the same lighting operation for the apparatuses set to the parent mode and the child mode.

The predetermined lighting operation may be at least one of operations of turning on, turning off, dimming, and toning.

Since time lag control is performed on at least one of operations of turning on, turning off, dimming, and toning, it is possible to easily check the operation mode.

The predetermined lighting operation may be at least one of operations of turning on and turning off.

Since time lag control is performed on at least one of operations of turning on and turning off, it is possible to easily check the operation mode.

The information processing method may further include, in a case where the parent mode is set, transmitting, to the different electric light bulb light source apparatus set to the child mode, a synchronization control signal for executing synchronization control relating to the predetermined function.

In this information processing method, synchronization control relating to the predetermined function is executed by the apparatuses set to the parent mode and the child mode. Since the operation mode can be easily checked, it is possible to easily construct a system relating to synchronization control or change the setting, for example.

The functional unit may be a speaker. In this case, the synchronization control may include synchronous reproduction.

Since synchronous reproduction of music content can be performed by the plurality of electric light bulb light source apparatuses, it is possible to provide the user with a high viewing experience.

The predetermined lighting control signal may be a signal to be transmitted from a remote controller. In this case, the information processing method further include in a case where the child mode is set, invalidating the predetermined lighting control signal transmitted from the remote controller Accordingly, it is possible to exhibit high operability.

The information processing method may further include: in a case where the parent mode is set, setting, in response to a link control signal transmitted from the remote controller, an operation mode relating to a link with an external apparatus to a stand-by mode enabling the link, the external apparatus being capable of controlling an operation of the functional unit; and in a case where the child mode is set, invalidating the link control signal transmitted from the remote controller.

Accordingly, it is possible to prevent the apparatus set to the child mode from entering the stand-by mode. As a result, it is possible to improve the operability relating to the connection of the link for the user who operates the external apparatus.

The step of setting the operation mode may include setting the operation mode on the basis of a setting signal to be transmitted from the remote controller.

Accordingly, it is possible to easily set the operation mode by operating the remote controller.

The functional unit may include at least one of a speaker, an image sensor, and a sensor.

By using these devices, it is possible to construct various systems.

An electric light bulb light source apparatus according to an embodiment of the present technology includes a lighting unit, a functional unit, a setting unit, a first control unit, and a second control unit.

The lighting unit includes a light source.

The functional unit has a predetermined function.

The setting unit selects, from any of a parent mode and a child mode, an operation mode for cooperative control with a different electric light bulb light source apparatus with respect to the predetermined function, and sets the selected operation mode.

The first control unit causes, in a case where the parent mode is set, the lighting unit to execute a first lighting operation for the parent mode in response to a predetermined lighting control signal relating to an operation of the lighting unit, and transmits, to the different electric light bulb light source apparatus set to the child mode, a cooperative control signal for causing a second lighting operation for the child mode to be executed, the second lighting operation for the child mode being different from the first lighting operation.

The second control unit causes, in a case where the child mode is set, the lighting unit to execute the second lighting operation on the basis of the cooperative control signal transmitted from the different electric light bulb light source apparatus set to the parent mode.

An information processing system according to an embodiment of the present technology includes the lighting unit, the functional unit, one or more electric light bulb light source apparatuses, and a remote controller.

The remote controller transmits the predetermined lighting control signal to the electric light bulb light source apparatus set to the parent mode among the one or more electric light bulb light source apparatuses.

Advantageous Effects of Invention

As described above, according to the present technology, it is possible to easily check the operation modes of a plurality of electric light bulb light source apparatuses that operate in cooperation with each other. It should be noted that the effects described here are not necessarily limitative and any effect described in the present disclosure may be provided.

BRIEF DESCRIPTION OF DRAWINGS

FIG. 6 is a timing chart showing an example of first and second lighting operations.

MODE(S) FOR CARRYING OUT THE INVENTION

Hereinafter, an embodiment of the present technology will be described with reference to the drawings.

Configuration of Lighting Control System

Figure 1:
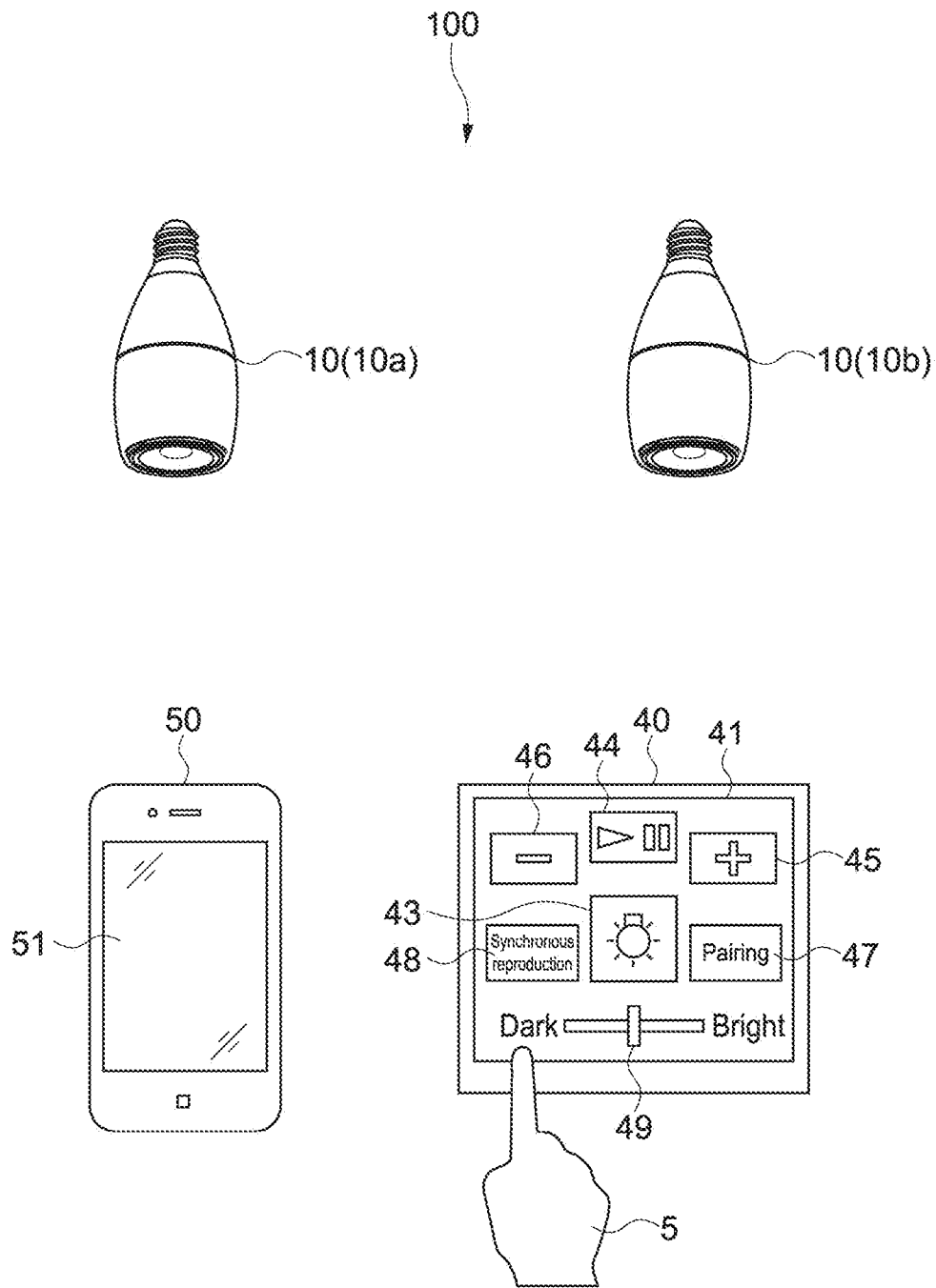
FIG. 1 is a schematic diagram showing a configuration example of a lighting control system according to an embodiment of the present technology.
Figure 2:
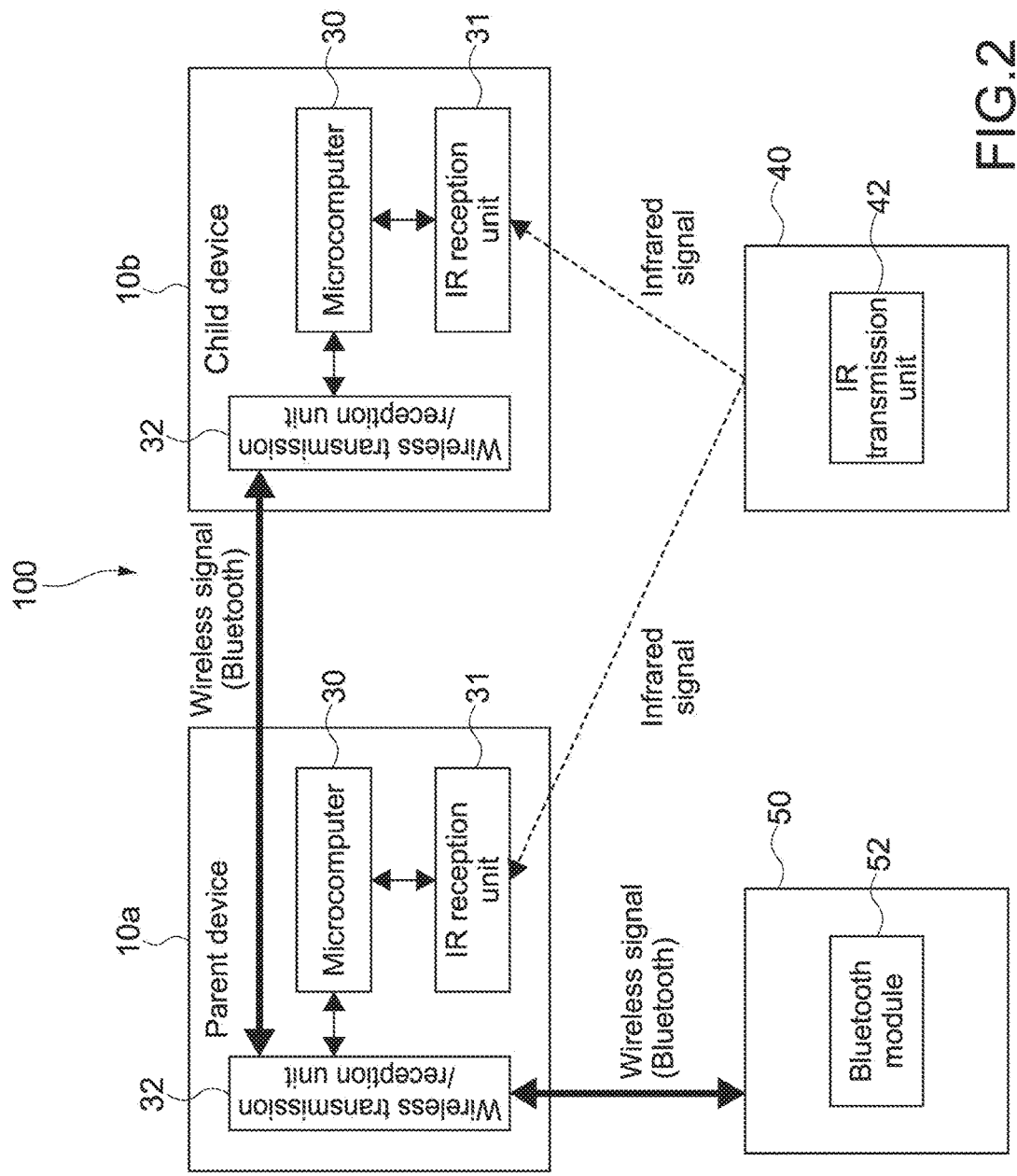
FIG. 2 is a block diagram showing a functional configuration example of the lighting control system shown in FIG. 1.

FIG. 1 and FIG. 2 are each a schematic diagram showing a configuration example of a lighting control system according to an embodiment of the present technology. FIG. 1 is a diagram showing an appearance example of each device in the system, and FIG. 2 is a diagram showing a function configuration example of each device. Note that this lighting control system is an embodiment of an information processing system according to the present technology.

A lighting control system 100 includes one or more electric light bulb light source apparatuses (hereinafter, referred to simply as light source apparatuses) 10, a remote controller (hereinafter, referred to simply as remote) 40, and a portable terminal 50.

The one or more light source apparatuses 10 each have a lighting function and an audio output function. In this embodiment, as the one or more light source apparatuses 10, a first light source apparatus 10a and a second light source apparatus 10b are used. As light source apparatuses, these are the same devices, and have the same configuration.

Figure 3:
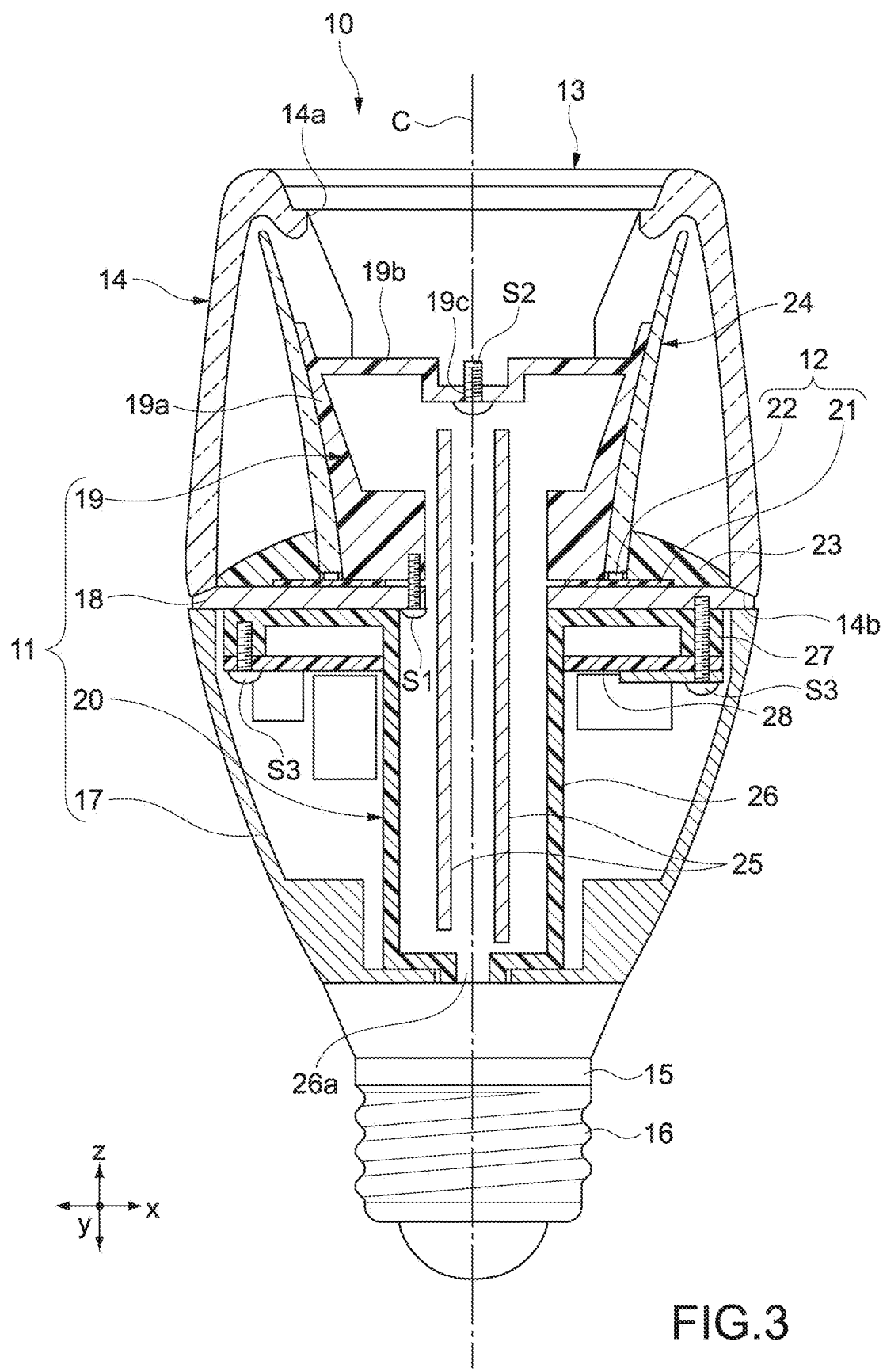
FIG. 3 is a schematic cross-sectional view showing a configuration example of a light source apparatus.

FIG. 3 is a schematic cross-sectional view showing a configuration example of the light source apparatus 10. The light source apparatus 10 includes a base unit 11, a light source unit 12, a speaker 13 provided on one end side in a z-axis direction, and a translucent cover 14. Further, the light source apparatus 10 includes a base 16 provided on the other end side (opposite side to the position of the speaker 13) in the z-axis direction via an electrically insulating ring 15.

For convenience of description, hereinafter, description will be made with the direction along the z-axis in FIG. 3 as the longitudinal direction of the light source apparatus 10, specifically, with the side of the speaker 13 as the front side and the side of the base 16 as the back side.

The base unit 11 includes a base housing 17, a heat sink 18, a holding member 19, and a substrate accommodating box 20. The base housing 17 has an opening on the front side, and the heat sink 18 is placed so as to close the opening. The base housing 17 has a high thermal conductivity, and is thermally connected to the heat sink 18.

The translucent cover 14 has a first opening 14a formed at the end portion on the front side, and a second opening 14b formed at the end portion on the side opposite thereto. The speaker 13 is attached to the translucent cover 14 so that the speaker 13 closes the first opening 14. The side of the second opening 14b is connected to the base housing 17 via the heat sink 18. The translucent cover 14 is formed of, for example, an injection-moldable material such as acrylic and polycarbonate.

The heat sink 18 is placed around a virtual central axis C that is an axis passing through the center of the speaker 13 along the direction (z-axis direction) in which the diaphragm of the speaker 13 vibrates. The heat sink 18 has a plate-like shape, and is annularly formed around the entire periphery of the central axis C.

Also the light source unit 12 is placed around the central axis C similarly to the heat sink 18, and placed on the heat sink 18. The light source unit 12 includes an annular mounting substrate 21 and a plurality of LED devices 22 arranged on the circumference of the mounting substrate 21. As each of the LED devices 22, a device that generates white light is used, but a device that generates light of a single color other than a white color or light of a plurality of colors may be used.

An annular cover 23 is attached on the mounting substrate 21. This cover 23 has a function of blindfolding the mounting substrate 21, and the surface thereof has a high reflectance.

The holding member 19 is a member that holds the speaker 13, and fixed to the heat sink 18 by a screw S1 attached to a screw hole formed in the heat sink 18. The holding member 19 has a cylindrical side wall 19a and a support plate 19b for supporting the speaker 13. A cylindrical light-guiding plate 24 is placed on the outer peripheral surface of the side wall 19a, and light from the light source unit 12 is evenly surface-emitted on the outer surface thereof.

A screw hole 19c is provided in a central portion through which the central axis C of the support plate 19b passes. By attaching a screw S2 to the screw hole 19c, the speaker 13 is fixed on the support plate 19b.

In the substrate accommodating box 20, various circuit substrates 25 are accommodated. The substrate accommodating box 20 includes a main body 26 and a flange contact portion 27 provided so as to protrude from the main body 26 in a direction perpendicular to the z-axis. In the main body 26, a plurality of circuit substrates 25 are placed. The upper surface of the flange contact portion 27 is brought into contact with the heat sink 18. On the lower surface of the flange contact portion 27, an annular power source circuit substrate 28 is placed. The flange contact portion 27 and the power source circuit substrate 28 are connected to the heat sink 18 by a plurality of screws S3 or the like.

On the back side of the main body 26 of the substrate accommodating box 20, a screw hole 26a is provided. By a screw (not shown) attached to the screw hole 26a, the substrate accommodating box 20 and the base housing 17 are connected to each other.

On the plurality of circuit substrates 25, driving circuits for the light source unit 12 and the speaker 13, an antenna and network control circuit for wireless communication, a transmission/reception unit for an infrared signal (remote control signal), a microcomputer that controls them (neither of which is not shown), and the like are amounted. In this embodiment, as the antenna and network control circuit, one capable of executing near field communication according to the Bluetooth (registered trademark) standard (hereinafter, referred to as Bluetooth communication) is mounted.

A microcomputer 30 shown in FIG. 2 is a device in which a predetermined IC (integrated circuit), a CPU, a memory (RAM, ROM), an I/O (Input/Output), and the like are contained in one chip. The CPU loads a program recorded in the ROM in advance into the RAM to execute the program, thereby executing various kinds of processing. Also the information processing method according to the present technology described below is realized by cooperation of software resources such as a program and hardware resources such as a CPU.

As shown in FIG. 2, the light source apparatus 10 includes the microcomputer 30, an IR reception unit 31, and a wireless transmission/reception unit 32. The IR reception unit 31 receives an infrared signal transmitted from a remote 40, and outputs it to the microcomputer 30. The microcomputer 30 executes various kinds of processing depending on the received infrared signal. The IR reception unit 31 is realized by the above-mentioned transmission/reception unit.

The wireless transmission/reception unit 32 receives a control signal transmitted from an external apparatus capable of performing the Bluetooth communication, and outputs it to the microcomputer 30. The microcomputer 30 executes various kinds of processing depending on the received control signal. Further, the wireless transmission/reception unit 32 is capable of transmitting various control signals via the Bluetooth communication. The wireless transmission/reception unit 32 is a module for establishing the Bluetooth communication, and realized by, for example, the above-mentioned antenna and network control circuit. Note that an arbitrary Bluetooth module may be used.

As shown in FIG. 2, in this embodiment, the Bluetooth communication is executed between the first and second light source apparatuses 10a and 10b. Note that description of the parent device and the child device in the figure will be made later.

In this embodiment, the light source unit 12 and the speaker 13 respectively correspond to a lighting unit and a functional unit. Further, the microcomputer 30 functions as a setting unit, a first control unit, and a second control unit. The specific configuration of each element is not limited to the one described above, and may be appropriately designed.

As shown in FIG. 1 and FIG. 2, the remote 40 includes an operation unit 41 to be operated by a user 5, and an IR transmission unit 42 that outputs an infrared signal for controlling an operation of the light source apparatus 10. The operation unit 41 includes a turn on/off button 43, a reproduction/pause button 44, a sound volume plus button 45, a sound volume minus button 46, a pairing button 47, a synchronous reproduction button 48, and a dimming slide bar 49.

The turn on/off button 43 and the dimming slide bar 49 are used when controlling turning on, turning off, and dimming of the light source unit 12. The reproduction/pause button 44, the sound volume plus button 45, and the sound volume minus button 46 are used for controlling reproduction of music content by the speaker 13.

The pairing button 47 is a button for setting the light source apparatus 10 to a pairing mode in which the light source apparatus 10 stands by for pairing with an external apparatus capable of executing the Bluetooth communication. The light source apparatus 10 in the pairing mode is detected by the external apparatus as a apparatus capable of executing pairing. Then, pairing is executed in response to a pairing request from the external apparatus.

In this embodiment, the pairing mode corresponds to one operation mode relating to a link with an external apparatus, and to a stand-by mode enabling the link.

The synchronous reproduction button 48 is a button for selecting a synchronous reproduction mode for synchronously reproducing music content by the speaker 13 of each of the first and second light source apparatuses 10*a* and 10*b*. Note that the synchronous reproduction by the first and second light source apparatuses 10*a* and 10*b* in this embodiment corresponds to cooperative control with a different light source apparatus and synchronization control relating to a predetermined function.

The portable terminal 50 includes a touch panel display (hereinafter, referred to simply as touch panel) 51 and a Bluetooth module 52. The portable terminal 50 is capable of controlling the reproduction operation of music content by a speaker apparatus capable of executing the Bluetooth communication by executing pairing with the speaker apparatus and transmitting music data and a reproduction control signal.

Figure 4:
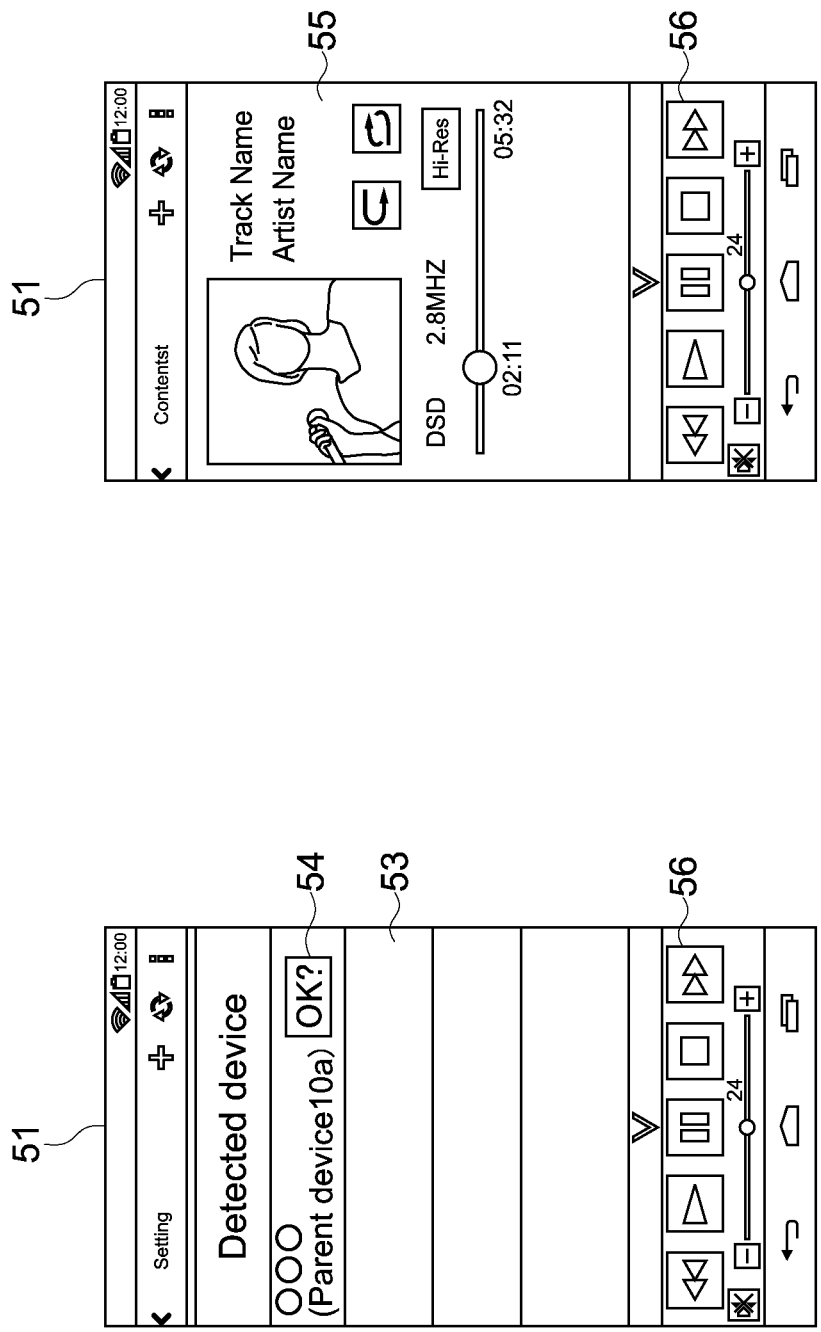
FIGS. 4A and 4B are diagrams showing a configuration example of a GUI displayed on a touch panel.

FIGS. 4A and 4B are diagrams showing a configuration example of a GUI (Graphical User Interface) displayed on the touch panel 51. For example, as shown in FIG. 4A, when pairing is executed, a detected speaker apparatus in the pairing mode is displayed on a detected apparatus display portion 53 of the touch panel 51. The user 5 selects, from the displayed speaker apparatuses, a speaker apparatus by which music content is desired to be reproduced, and presses an OK button 54. The pairing is executed in this way. Note that description of the parent device 10*a* in the figure will be made later.

Further, as shown in FIG. 4B, at the time of reproducing music content, information regarding content being reproduced is displayed on a music information display portion 55 of the touch panel 51. Further, by operating a plurality of control buttons 56 displayed on the lower part of the touch panel 51, it is possible to control the reproduction operation.

In this embodiment, the portable terminal 50 corresponds to an external apparatus capable of controlling an operation of the functional unit. As the portable terminal 50, a smartphone is typically used. However, it is not limited thereto, and various PDAs (Personal Digital Assistants) such as tablet terminals and game machines, or the like may be used. In addition, an arbitrary apparatus such as a PC may be used as the external apparatus as long as it is an apparatus that is capable of controlling the reproduction operation of the speaker 13 via the Bluetooth communication. Note that the external apparatus can be appropriately changed by the user 5. Therefore, it is also possible to regard the first and second light source apparatuses 10*a* and 10*b* and the remote 40 as main elements of the lighting control system according to the present technology.

Operation of Lighting Control System

Figure 5:
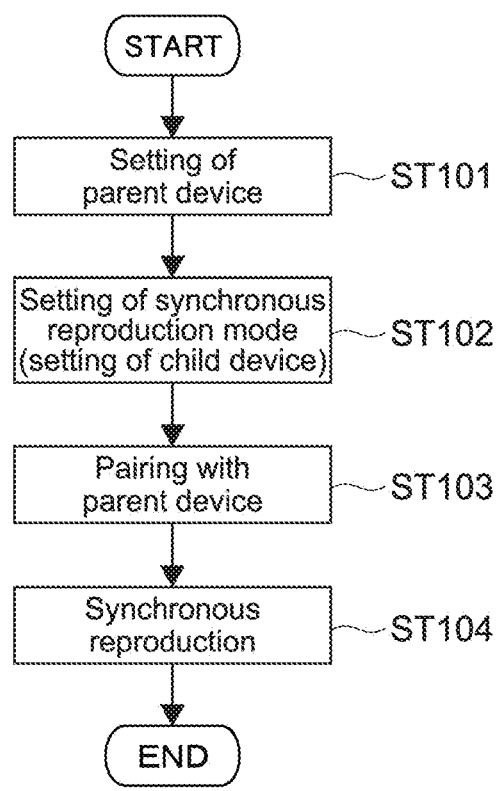
FIG. 5 is a flowchart showing an operational example of the lighting control system shown in FIG. 1.

FIG. 5 is a flowchart showing an operational example of the lighting control system 100. Each step shown in FIG. 5 is executed in response to the operation by the user 5 who uses this system to execute synchronous reproduction of music content.

In this embodiment, an operation mode relating to synchronous reproduction is set to each of the light source apparatuses 10. Specifically, one light source apparatus 10 is set to the parent mode, and a different light source apparatus 10 is set to the child mode. Hereinafter, the light source apparatus 10 set to the parent mode will be referred to as the parent device, and the light source apparatus 10 set to the child mode will be referred to as the child device in some cases.

In the synchronous reproduction of music content, pairing is executed between the portable terminal 50 and the parent device, and music data and a reproduction control signal are transmitted to the parent device. The parent device transmits the received music data and a synchronization control signal for executing synchronous reproduction to the child device by the Bluetooth communication. In this way, the synchronous reproduction of music content is executed.

Note that as a technology for achieving synchronous reproduction by the parent device and the child device, an arbitrary technology may be used. For example, the synchronous reproduction can be executed by synchronization by clock and time stamp and by combining buffer processing therewith. Examples thereof include flow control that controls RTP (Real-time Transport Protocol) and RTCP (RTP Control Protocol).

Further, in this embodiment, as the synchronous reproduction mode, two modes of a stereo mode and a double mode can be executed. The stereo mode is a mode in which sound of the left channel (L side) is reproduced from one light source apparatus 10 and sound of the right channel (R side) is reproduced from the different light source apparatus 10. In this embodiment, the parent device is the light source apparatus 10 on the L side and the child device is the light source apparatus 10 on the R side. It goes without saying that they may be replaced with each other.

The double mode is a mode in which the same sound (monaural sound) is reproduced from two light source apparatuses 10. The user 5 is capable of achieving a high viewing experience by appropriately selecting these synchronous reproduction modes. Note that the stereo mode and the double mode can be selected by operating the remote 40.

In the case where the synchronous reproduction mode is set, control using the plurality of control buttons 56 shown in FIG. 4B or the like, setting of an equalizer, and the like are synchronously executed between the first and second light sources 10a and 10b. Also the synchronization control is included in the cooperative control relating to the predetermined function.

In the example shown in FIG. 2, the first and second light source apparatuses 10a and 10b are respectively set to the parent mode and the child mode. Hereinafter, the first and second light source apparatuses 10a and 10b will be respectively referred to as the parent device 10a and the child device 10b using the same reference symbols, in some cases.

As shown in FIG. 5, setting of the parent device (setting of the parent mode) is executed first (Step 101). The first light source apparatus 10a desired to be set to the parent device is attached to a socket, and the power source thereof is turned on (turn on the light source unit 12). Meanwhile, the second light source apparatus 10b desired to be set to the child device is not attached to a socket so that power is not supplied thereto. It goes without saying that the second light source apparatus 10b may be attached to a socket as long as the power source can be individually turned off.

The remote 40 is directed to the first light source apparatus 10a, and the pairing button 47 and the synchronous reproduction button 48 are simultaneously held down. Accordingly, a setting signal (infrared signal) for setting the parent mode is transmitted from the remote 40 to the first light source apparatus 10a. Note that the method of operating the remote 40 is not limited. This applies to the following description.

The microcomputer 30 of the first light source apparatus 10a sets the operation mode of the first light source apparatus 10a to the parent mode on the basis of the setting signal received from the IR reception unit 31. When the setting of the parent device is completed, alarm sound (e.g., "beep") indicating the completion may be output from the speaker 13.

Next, setting of the child device is executed. In this embodiment, setting of the synchronous reproduction mode in which music content is synchronously reproduced is executed instead of the setting of the child device. That is, by performing the setting of the synchronous reproduction mode, the light source apparatus 10b other than the parent device 10a is set to the child device (Step 102).

The second light source apparatus 10b desired to be set to the child device is attached to a socket, and the power source thereof is turned on (turn on the light source unit 12). The synchronous reproduction button 48 of the remote 40 is held down. Accordingly, a setting signal (infrared signal) for setting the child device is transmitted to the second light source apparatus 10b. On the basis of the setting signal, the child device mode is set by the microcomputer 30 of the second light source apparatus 10b. At this time, alarm sound (e.g., "beep-beep") different from the alarm sound at the time of setting the parent device 10a may be output from the speaker 13.

In the second light source apparatus 10b set to the child device, the infrared signal transmitted from the remote 40 is invalidated (an infrared signal directed to the second light source apparatus 10b shown in FIG. 2 is invalidated). Therefore, the child device 10b stops reacting to the operation of the remote 40. The method of invalidating the infrared signal is not limited, and arbitrary processing such as stopping of reception of the infrared signal and stopping of execution of processing according to the infrared signal by the microcomputer 30 may be adopted.

Note that regarding control of the light source unit 12 and the speaker 13 of the child device 10b, a control signal is appropriately transmitted from the parent device 10a to the child device 10b via the Bluetooth communication.

The child mode may be set as the initial setting of the light source apparatus 10. In this case, at the stage where the synchronous reproduction mode is set, processing corresponding to the child mode such as invalidating of the infrared signal is executed. Note that a state in which the synchronous reproduction mode is set and the parent mode is not set can be regarded as a child mode state.

Pairing between the portable terminal 50 and the parent device 10a is executed (Step 103). The remote 40 is directed to the parent device 10a, and the pairing button 47 is pressed. Accordingly, a link control signal (infrared signal) for setting the pairing mode is transmitted from the remote 40 to the parent device 10a. The microcomputer 30 of the parent device 10a sets the parent device 10a to the pairing mode on the basis of the received link control signal. At this time, alarm sound may be output.

The user 5 operates the portable terminal 50, and turns on the connection mode of the Bluetooth communication. Accordingly, as shown in FIG. 4A, the parent device 10a is displayed on the detected apparatus display portion 53 of the touch panel 51. When the OK button 54 is pressed, the portable terminal 50 and the parent device 10a are paired.

In the child device 10b, since the infrared signal from the remote 40 is invalidated, the pairing mode is not set even in the case where the link control signal reaches the IR reception unit 31. Therefore, as shown in Part A of the figure, the child device 10b is not displayed on the detected apparatus display portion 53 of the touch panel 51. As a result, it is possible for the user 5 to reduce the trouble of determining and selecting the parent device 10a from the detected apparatuses. That is, it is possible to prevent the user 5 from being confused when selecting a pairing target, and exhibit very high operability.

As described above, in this embodiment, by invalidating the infrared signal on the side of the child device 10b, it is possible to restrict the setting to the pairing mode of the child device 10b. Accordingly, for example, it is unnecessary to provide a switch or the like for switching the availability of the pairing mode to the light source apparatus 10, and it is possible to simplify the structure and reduce the designing cost and the like. Further, also in the case where the switch or the like is placed, it is often difficult to operate the switch depending on the position where the light source apparatus 10 is placed. By applying the present technology, it is possible to easily restrict the setting of the pairing mode of the child device 10b.

The synchronous reproduction is executed by the parent device 10a and the child device 10b (Step 104). The user 5 operates the portable terminal 50, and selects music content desired to be reproduced. The corresponding music data and control signal (Bluetooth signal) are transmitted to the parent device 10a. The microcomputer 30 of the parent device 10a transmits the received music data and a synchronization control signal (Bluetooth signal) to the child device. Accordingly, the synchronous reproduction of music content by the parent device 10a and the child device 10b is executed. Note that at the time of the synchronous reproduction, time information or the like may be transmitted from the child device 10b to the parent device 10a.

As the mode of the synchronous reproduction, for example, the stereo mode is set as initial setting. In the case of changing the mode, the synchronous reproduction button 48 is pressed with the remote 40 directed toward the parent device 10a. Accordingly, a change to the double mode is executed. At the time of switching of the mode, alarm sound indicating the switching may be output. Note that the double mode may be set as initial setting.

In the case of releasing the synchronous reproduction mode, the synchronous reproduction button 48 is held down. Accordingly, it is possible to individually control each of the light source apparatuses 10. At the time of releasing, alarm sound may be output.

The method of checking the setting state of the parent device 10a and the child device 10b will be described. A predetermined lighting control signal (infrared signal) relating to the operation of the light source unit 12 is transmitted from the remote 40 to the parent device 10a. The microcomputer 30 of the parent device 10a causes the light source unit 12 to execute a first lighting operation for the parent mode, in response to the received lighting control signal. Further, the microcomputer 30 of the parent device 10a transmits, to the child device 10b, a cooperative control signal (Bluetooth signal) for causing a second lighting operation for the child mode different from the first lighting operation to be executed.

The microcomputer 30 of the child device 10b causes the light source unit 12 to execute the second lighting operation, on the basis of the received cooperative control signal. That is, the lighting operations in a different manner are executed by the parent device 10a and the child device 10b according to the predetermined operation relating the lighting operation by the user 5. Accordingly, the user 5 is capable of visually and easily checking the parent device 10a and the child device 10b.

FIG. 6 is a timing chart showing an example of the first and second lighting operations. In this embodiment, the first and second lighting operations are set with regard to the operation of turning on and off of the light source unit 12. Specifically, at the time of turning on, the parent device 10a is turned on first, and then, the child device 10b is turned on. Even at the time of turning off, the parent device 10a is turned off first, and then, the child device 10b is turned off. That is, the time lag control of turning on and off is executed.

The turn on/off button 43 is pressed with the remote 40 being directed to the parent device 10a while both the parent device 10a and the child device 10b are turned off. Accordingly, a lighting control signal for turning on the light source unit 12 is transmitted to the parent device 10a.

As shown in FIG. 6, the microcomputer 30 of the parent device 10a turns on the light source unit 12 at a first timing T1 based on the timing of receiving the lighting control signal. Further, the microcomputer 30 of the parent device 10a transmits, to the child device 10b, a cooperative control signal for turning on the light source unit 12 at a second timing T2 after t1 second of the first timing. The microcomputer 30 of the child device 10b turns on the light source unit 12 at the second timing T2 on the basis of the received cooperative control signal. Accordingly, time lag turning-on in which turning on of the child device 10b is delayed by 1 second is executed.

Further, the turn on/off button 43 is pressed with the remote 40 being directed to the parent device 10a while both the parent device 10a and the child device 10b are turned on. A lighting control signal for turning off the light source unit 12 is transmitted to the parent device 10a, and the light source unit 12 is turned off at a first timing T'1. Further, a cooperative control signal for turning off the light source unit 12 at a second timing T'2 after t2 second of the first timing T'1 is transmitted to the child device 10b. On the basis of the cooperative control signal, the light source unit 12 of the child device 10b is turned off at the second timing T'. Accordingly, time lag turning-off in which turning off of the child device 10b is delayed by t2 second is executed.

The specific values of t1 second and t2 second that are time differences are not limited, and may be appropriately set. The values of t1 and t2 may be the same or different. Note that turning on and off at the first timings T1 and T'1 correspond to the first lighting operation. Further, turning on and off at the second timings T2 and T'2 correspond to the second lighting operation.

In FIG. 6, the first timings T1 and T'1 are set to the timing of the falling edge pulse of the lighting control signal, but this is not restrictive. Further, "transmitting the cooperative control signals for turning and off the light source unit at the second timings T2 and T'2" executed by the parent device 10a includes "transmitting the cooperative control signals for causing turning on and off to be executed at appropriate timings at which turning on and off at the second timings T2 and T'2 are executed.

As described above, in this embodiment, the first and second lighting operations are respectively set with regard to the general operation of the light source apparatus 10 such as turning on and off, and time lag turning-on and time lag turning-off are executed. Accordingly, the user 5 is capable of easily checking the operation modes of the plurality of light source apparatuses 10 that cooperate with each other, i.e., whether it is the parent device 10a or the child device 10b, on the basis of the remote control operation generally performed on the light source apparatus 10.

As a result, it is possible to easily check the position of the parent device 10a to which the remote 40 or the portable terminal 50 is to be directed, and execute lighting control, reproduction control of music content, and the like without stress. Further, it is possible to easily check the positions of the speakers 13 on the LR sides in the stereo mode, and easily perform setting of LR, a setting change, and the like according to the preference. That is, it is possible to construct a desired system. Further, it is also possible to easily check the setting state of LR set by another person.

Further, since there is no need to provide an indicator or the like for making it possible to determine the operation mode to the light source apparatus 10, it is possible to simplify the structure and reduce the designing cost and the like. Further, it is possible to improve the designability. Note that also in the case where an indicator or the like is placed, it is often difficult to check the indicator depending on the position where the light source apparatus 10 is placed. Therefore, the present technology for making the lighting manner different between the parent device 10a and the child device 10b is very effective.

The method of setting the first lighting operation for the parent mode and the second lighting operation for the child mode can be arbitrarily set. It only needs to set the first and second lighting operations so that the manner of the arbitrary lighting operation executed by the light source apparatus 10 differs.

For example, at the time of turning on, time lag turning-on may be performed from the child device 10b first. Further, only one of the parent device 10a and the child device 10b may blink an arbitrary number of times before turning on. Further, only one of the light source apparatuses 10 may be set to have a delayed rising time of the light amount at the time of turning on. Also at the time of turning off, for example, time lag turning-off in which the child device 10b is turned off first, turning off after one of the light source apparatuses 10 blinks, a gentle decrease in the light amount until turning off, or the like may be set.

The first and second lighting operations may be set with regard to not only turning on and off but also dimming and toning. For example, the light source unit 12 of the parent device 10*a* is dimmed (first lighting operation) at a predetermined change rate in response to a lighting control signal transmitted by the operation of the dimming slide bar 49 shown in FIG. 1. Meanwhile, in response to the cooperative control signal from the parent device 10*a*, the light source unit 12 of the child device 10*b* is dimmed at the change rate smaller or larger than the change rate in the parent device 10*a*. The user 5 is capable of easily checking the operation mode on the basis of the difference of the change in light and dark (light amount) at the time of dimming (also regarded as the time lag control of dimming).

Although not shown in FIG. 1, assumption is made that a button or the like for adjusting colors of light, such as red, green, and blue, to be emitted from the light source unit 12 is provided. Toning is executed in each of the parent device 10*a* and the child device 10*b* (also regarded as the time lag control of toning) so that the rate of change in color differs depending on the operation of the button or the like for toning. Accordingly, the user 5 is capable of easily checking the operation mode.

The first and second lighting operations may be set with regard to at least one or all of operations of turning on, turning off, dimming, and toning, or any combination thereof. For example, the first and second lighting operations are set with regard to turning on and dimming. Alternatively, the first and second lighting operations may be set with regard to turning off and toning.

The setting of the parent device 10*a* and the child device 10*b* is stored in a memory in the corresponding light source apparatuses 10 before the synchronous reproduction mode is released. Therefore, by changing the attachment positions of the parent device 10*a* and the child device 10*b*, it is possible to easily change the reproduction state of the stereo mode (positions of LR).

In the case of changing the setting of the parent device 10*a* and the child device 10*b*, an operation is appropriately performed so that the synchronous reproduction mode is released and the power source of only the light source apparatus 10 desired to be set to the parent device is turned on. Then, the above-mentioned setting operation for the parent device is executed on the light source apparatus 10 desired to be set to the parent device. Alternatively, instead of or in addition to release of the synchronous reproduction mode, an operation of releasing the operation mode may be predetermined. After executing the release operation, setting of the parent device is executed.

In the present technology, it is possible to easily set the operation mode of each light source apparatus 10 by using the remote 40, and easily change the setting. Therefore, for example, it is unnecessary to provide a switch or the like for setting the parent mode and the child mode to the light source apparatus 10, and it is possible to simplify the structure and reduce the designing cost and the like.

OTHER EMBODIMENTS

The present technology is not limited to the embodiment described above, and various other embodiments can be realized.

As the functional unit having the predetermined function, instead of or in addition to the above-mentioned speaker 13, an image sensor or various other sensors may be mounted. That is, a camera mechanism, a sensor mechanism, or the like may be built in the light source apparatus 10. It goes without saying that it is not limited thereto, and a functional unit having another function such as a wireless router function may be structured. Further, these functions may be appropriately combined and installed in the light source apparatus 10.

As the image sensor, for example, a CMOS (Complementary Metal-Oxide Semiconductor) sensor, a CCD (Charge Coupled Device) sensor, or the like is used. Examples of the various sensors include a photosensor, an ultrasonic sensor, a radiation sensor, and a temperature sensor. It goes without saying that it is not limited thereto.

Figure 7A:
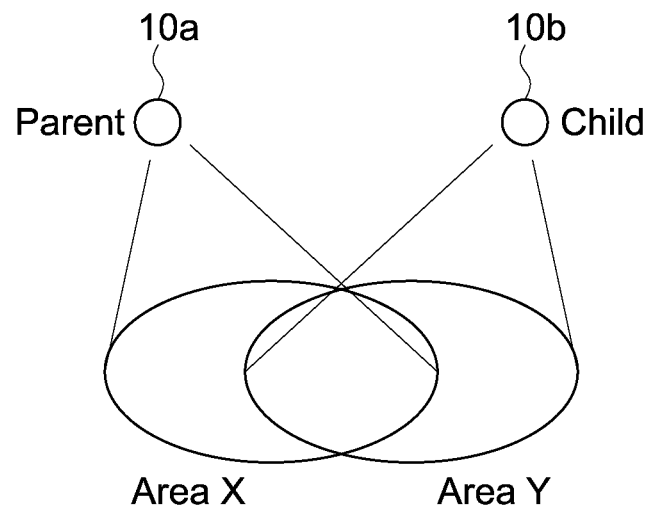
FIGS. 7A and 7B are diagrams describing an operation mode relating to an image sensor and other sensors.
Figure 7B:
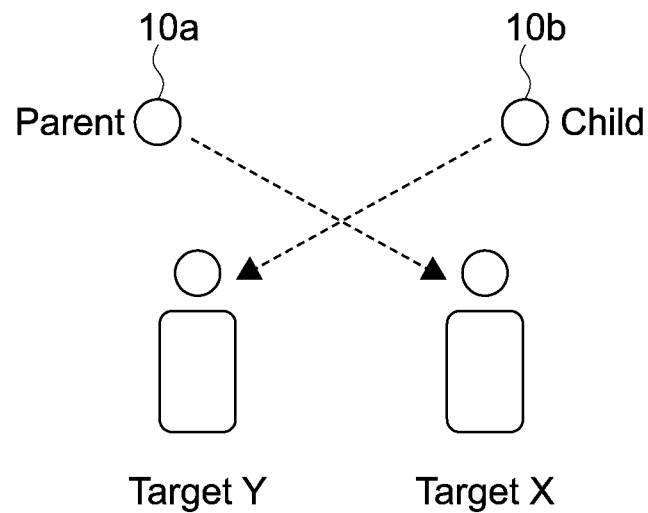

FIGS. 7A and 7B are diagrams describing an operation mode relating to an image sensor and other sensors. For example, as shown in FIG. 7A, an imaging area or detection area (sensing area) may be set so as to correspond to the operation mode. In the example shown in FIG. 7A, the parent device 10*a* is placed at a position where an area X is an imaging area or detection target area. Meanwhile, the child device 10*b* is placed at a position where an area Y is an imaging area or a detection target area.

As shown in FIG. 7B, an imaging target or detection target (sensing target) may be set so as to correspond to the operation mode. In the example shown in FIG. 7B, the parent device 10*a* is placed at a position where a target X is an imaging target or detection target. The child device 10*b* is placed at a position where a target Y is an imaging target or detection target.

As the cooperative control of the image sensor by the parent device 10*a* and the child device 10*b*, arbitrary control may be executed. Examples of the control include imaging at a predetermined timing and cooperative control of setting conditions relating to imaging. Similarly, arbitrary control may be performed as the cooperative control of other sensors by the parent device 10*a* and the child device 10*b*. Examples of the control include processing relating to security based on the result of sensing such as output of warning sound and locking of a door. It goes without saying that it is not limited thereto.

The method of causing the parent device 10*a* and the child device 10*b* to perform cooperative control is similar to the above-mentioned method of controlling synchronous reproduction. By implementing the present technology, it is possible to easily check the setting state of the parent device 10*a* and the child device 10*b*. That is, it is possible to easily check which area or which target is imaged or sensed by which light source apparatus 10. As a result, it is possible to construct a desired imaging system and detection system.

In the above description, connection between the portable terminal 50 and the parent device 10*a*, and connection between the parent device 10*a* and the child device 10*b* are realized by near field communication such as the Bluetooth communication. However, it is not limited thereto. These devices may be connected to each other by a wireless LAN (Local Area Network) such as WiFi, and the lighting control signal and the cooperative control signal may be transmitted via a network.

In the above description, two light source apparatuses 10 of the parent device 10*a* and the child device 10*b* have been described as an example. However, it is not limited thereto, and the present technology is applicable to three or more light source apparatuses 10. One of the three or more light source apparatuses 10 is set to the parent device, and the other light source apparatuses 10 are each set to the child device. Regarding the cooperative control relating to the predetermined function, a cooperative control signal is transmitted from the parent device that receives a control signal from an external apparatus to the child device. The user 5 is capable of easily checking the operation mode of each light source apparatus 10 by inputting a predetermined operation such as turning on and turning off.

In the above description, the infrared signal from the remote 40 is invalidated after it is set to the child device. Alternatively, only a predetermined control signal transmitted from the remote 40 may be invalidated. That is, a control signal that is to be invalidated may be appropriately selected. For example, only the above-mentioned link control signal for setting the light source apparatus 10 to the pairing mode is invalidated.

A check button for checking the setting state of the parent device 10a and the child device 10b may be provided to the remote 40. When the check button is pressed, the first and second lighting operations set in advance are executed. The user 5 is capable of easily checking the parent device 10a and the child device 10b by viewing the lighting operations executed in a different manner.

The remote controller for transmitting the lighting control signal and the external apparatus that transmits a control signal for performing cooperative control may be integrally configured. For example, it is conceivable that an application or the like capable of making it possible to perform remote control is downloaded to a smartphone or the like. Also in this case, the present technology is applicable.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

Note that the present technology may also take the following configurations.

(1) An information processing method executed by an electric light bulb light source apparatus, which includes a lighting unit including a light source, and a functional unit having a predetermined function, the information processing method including:

selecting, from any of a parent mode and a child mode, an operation mode for cooperative control with a different electric light bulb light source apparatus with respect to the predetermined function, and setting the selected operation mode;

in a case where the parent mode is set, causing the lighting unit to execute a first lighting operation for the parent mode in response to a predetermined lighting control signal relating to an operation of the lighting unit, and transmitting, to the different electric light bulb light source apparatus set to the child mode, a cooperative control signal for causing a second lighting operation for the child mode to be executed, the second lighting operation for the child mode being different from the first lighting operation; and in a case where the child mode is set, causing the lighting unit to execute the second lighting operation on the basis of the cooperative control signal transmitted from the different electric light bulb light source apparatus set to the parent mode.

(2) The information processing method according to (1), in which the predetermined lighting control signal is a signal that controls at least one of turning on, turning off, dimming, and toning.

(3) The information processing method according to (1) or (2), in which the first lighting operation is a predetermined lighting operation at a first timing based on a timing at which the predetermined lighting control signal is received, and the cooperative control signal is a signal for causing the predetermined lighting operation at a second timing later than the first timing to be executed as the second lighting operation.

(4) The information processing method according to (3), in which the predetermined lighting operation is at least one of operations of turning on, turning off, dimming, and toning.

(5) The information processing method according to (4), in which the predetermined lighting operation is at least one of operations of turning on and turning off.

(6) The information processing method according to any one of (1) to (5), further including in a case where the parent mode is set, transmitting, to the different electric light bulb light source apparatus set to the child mode, a synchronization control signal for executing synchronization control relating to the predetermined function.

(7) The information processing method according to (6), in which the functional unit is a speaker, and the synchronization control includes synchronous reproduction.

(8) The information processing method according to any one of (1) to (7), in which the predetermined lighting control signal is a signal to be transmitted from a remote controller, the information processing method further comprising in a case where the child mode is set, invalidating the predetermined lighting control signal transmitted from the remote controller.

(9) The information processing method according to (8), further including:

in a case where the parent mode is set, setting, in response to a link control signal transmitted from the remote controller, an operation mode relating to a link with an external apparatus to a stand-by mode enabling the link, the external apparatus being capable of controlling an operation of the functional unit; and in a case where the child mode is set, invalidating the link control signal transmitted from the remote controller.

(10) The information processing method according to (8) or (9), in which the step of setting the operation mode includes setting the operation mode on the basis of a setting signal to be transmitted from the remote controller.

(11) The information processing method according to any one of (1) to (10), in which the functional unit includes at least one of a speaker, an image sensor, and a sensor.

REFERENCE SIGNS LIST 10 light source apparatus
10a first light source apparatus
10b second light source apparatus
12 light source unit
13 speaker
25 circuit substrate
30 microcomputer
31 IR reception unit
32 wireless transmission/reception unit
40 remote controller (remote)

42 IR transmission unit
50 portable terminal
52 Bluetooth module
100 lighting control system

The invention claimed is:

1. An information processing method executed by an electric light bulb light source apparatus, which includes a lighting unit including a light source, and a functional unit having a predetermined function, the information processing method comprising:
    selecting, from any of a parent mode and a child mode, an operation mode for cooperative control with a different electric light bulb light source apparatus with respect to the predetermined function, and setting the selected operation mode;
    in a case where the parent mode is set, causing the lighting unit to execute a first lighting operation for the parent mode in response to a predetermined lighting control signal relating to an operation of the lighting unit, and transmitting, to the different electric light bulb light source apparatus set to the child mode, a cooperative control signal for causing a second lighting operation for the child mode to be executed, the second lighting operation for the child mode being different from the first lighting operation; and
    in a case where the child mode is set, causing the lighting unit to execute the second lighting operation on the basis of the cooperative control signal transmitted from the different electric light bulb light source apparatus set to the parent mode.

2. The information processing method according to claim 1, wherein
    the predetermined lighting control signal is a signal that controls at least one of turning on, turning off, dimming, and toning.

3. The information processing method according to claim 1, wherein
    the first lighting operation is a predetermined lighting operation at a first timing based on a timing at which the predetermined lighting control signal is received, and
    the cooperative control signal is a signal for causing the predetermined lighting operation at a second timing later than the first timing to be executed as the second lighting operation.

4. The information processing method according to claim 3, wherein
    the predetermined lighting operation is at least one of operations of turning on, turning off, dimming, and toning.

5. The information processing method according to claim 4, wherein
    the predetermined lighting operation is at least one of operations of turning on and turning off.

6. The information processing method according to claim 1, further comprising
    in a case where the parent mode is set, transmitting, to the different electric light bulb light source apparatus set to the child mode, a synchronization control signal for executing synchronization control relating to the predetermined function.

7. The information processing method according to claim 6, wherein
    the functional unit is a speaker, and
    the synchronization control includes synchronous reproduction.

8. The information processing method according to claim 1, wherein
    the predetermined lighting control signal is a signal to be transmitted from a remote controller,
    the information processing method further comprising
    in a case where the child mode is set, invalidating the predetermined lighting control signal transmitted from the remote controller.

9. The information processing method according to claim 8, further comprising:
    in a case where the parent mode is set, setting, in response to a link control signal transmitted from the remote controller, an operation mode relating to a link with an external apparatus to a stand-by mode enabling the link, the external apparatus being capable of controlling an operation of the functional unit; and
    in a case where the child mode is set, invalidating the link control signal transmitted from the remote controller.

10. The information processing method according to claim 8, wherein
    the step of setting the operation mode includes setting the operation mode on the basis of a setting signal to be transmitted from the remote controller.

11. The information processing method according to claim 1, wherein
    the functional unit includes at least one of a speaker, an image sensor, and a sensor.

12. An electric light bulb light source apparatus, comprising:
    a lighting unit including a light source;
    a functional unit having a predetermined function;
    a setting unit that selects, from any of a parent mode and a child mode, an operation mode for cooperative control with a different electric light bulb light source apparatus with respect to the predetermined function, and sets the selected operation mode;
    a first control unit that causes, in a case where the parent mode is set, the lighting unit to execute a first lighting operation for the parent mode in response to a predetermined lighting control signal relating to an operation of the lighting unit, and transmits, to the different electric light bulb light source apparatus set to the child mode, a cooperative control signal for causing a second lighting operation for the child mode to be executed, the second lighting operation for the child mode being different from the first lighting operation; and
    a second control unit that causes, in a case where the child mode is set, the lighting unit to execute the second lighting operation on the basis of the cooperative control signal transmitted from the different electric light bulb light source apparatus set to the parent mode.

13. An information processing system, comprising:
    one or more electric light bulb light source apparatuses, the one or more electric light bulb light source apparatuses each including
        a lighting unit including a light source,
        a functional unit having a predetermined function,
        a setting unit that selects, from any of a parent mode and a child mode, an operation mode for cooperative control with a different electric light bulb light source apparatus with respect to the predetermined function, and sets the selected operation mode,
        a first control unit that causes, in a case where the parent mode is set, the lighting unit to execute a first lighting operation for the parent mode in response to a predetermined lighting control signal relating to an operation of the lighting unit, and transmits, to the different electric light bulb light source apparatus set to the child mode, a cooperative control signal for causing a second lighting operation for the child mode to be executed, the second lighting operation for the child mode being different from the first lighting operation, and a second control unit that causes, in a case where the child mode is set, the lighting unit to execute the second lighting operation on the basis of the cooperative control signal transmitted from the different electric light bulb light source apparatus set to the parent mode; and a remote controller that transmits the predetermined lighting control signal to the electric light bulb light source apparatus set to the parent mode among the one or more electric light bulb light source apparatuses.

* * * * *